United States Patent
Frohaug et al.

(10) Patent No.: US 6,719,941 B1
(45) Date of Patent: Apr. 13, 2004

(54) POLYMER FOR ROTOMOULDING

(75) Inventors: Astrid Frohaug, Stathelle (NO); Anders Storen Sandaas, Stathelle (NO); Anne-Marie Fatnes, Stathelle (NO)

(73) Assignee: Borealis Technology Oy, Porvoo (FI)

( * ) Notice: Subject to any disclaimer, the term of this patent is extended or adjusted under 35 U.S.C. 154(b) by 0 days.

(21) Appl. No.: 09/763,342

(22) PCT Filed: Aug. 20, 1999

(86) PCT No.: PCT/GB99/02733
§ 371 (c)(1),
(2), (4) Date: May 18, 2001

(87) PCT Pub. No.: WO00/11065
PCT Pub. Date: Mar. 2, 2000

(30) Foreign Application Priority Data

Aug. 21, 1998 (GB) ............................................ 9818316

(51) Int. Cl.$^7$ ............................. B29C 41/04; C08J 3/22
(52) U.S. Cl. ........................ 264/310; 523/330; 523/351; 524/528; 525/240
(58) Field of Search .......................... 264/310; 523/330, 523/351; 524/528; 525/240

(56) References Cited

FOREIGN PATENT DOCUMENTS

| EP | 0 047 039 A1 | 3/1982 |
|----|--------------|--------|
| EP | 0 087 201 A1 | 8/1983 |
| EP | 0 172 448 A2 | 2/1986 |
| EP | 0 281 268 A2 | 9/1988 |
| GB | 2 272 448 A | 5/1994 |

OTHER PUBLICATIONS

Abstract of JP 07048483 A (Feb. 21, 1995).

*Primary Examiner*—Leo B. Tentoni
(74) *Attorney, Agent, or Firm*—Scully, Scott, Murphy & Presser

(57) ABSTRACT

The invention provides a process for the preparation of a moulded polymer item, said process comprising obtaining a polymer moulding powder having a mean particle size of 1 to 2000 μm comprising an admixture of UV-stabilizer-loaded polymer particles and non-UV-stabilizer-loaded polyolefin polymer particles, loading said powder into a mould, heating and rotating said mould to melt said powder, cooling said mould, and releasing said moulded polymer item from said mould.

17 Claims, No Drawings

POLYMER FOR ROTOMOULDING

BACKGROUND OF THE INVENTION

(1) Field of the Invention

This invention relates to a process for the preparation of moulded polyolefin polymer products, in particular to the moulding of a particulate polymer material by rotational moulding techniques and to the particulate polymer material and the moulded polymer products.

(2) Description of the Related Art

Rotational moulding is a polymer moulding technique which is particularly suitable for the production of large polymer products, especially containers. It is quite different from other conventional moulding techniques such as injection moulding or blow moulding. A mould is charged with polymer powder, closed and placed in an oven where it is rotated so as to distribute the polymer powder over the mould surface. Once the polymer has melted and formed a coating on the mould surface the mould is cooled. Rotational moulding is described for example by Oliveira et al. in J. Materials Sci, 31: 2227–2240 (1996), Bawiskar et al in Polymer Engineering and Science 34: 815–820 (1994) and Bruins, "Basic Principles of Rotational Moulding", Gordon and Breach, NY, 1971.

The polyolefin polymer powder used in rotational moulding, e.g. a polypropylene or more generally a polyethylene, requires the presence of stabilizers, including UV-stabilizers, to prevent degradation between the time the polymer is produced and when it is moulded. This is normally achieved by mixing polymer and stabilizers in an extruder mixer which applies shear force to mix the components and melt the polymer. The extrudate is then ground to produce a moulding powder of appropriate particle size. Such a procedure however is highly energy-consuming.

An alternative way of producing the stabilized moulding powder might thus have seemed to be to simply blend the stabilizers with an olefin polymer particulate which already has the appropriate particle size for rotational moulding, e.g. by spraying of liquid stabilizers or stabilizer solutions onto the polymer particulate and/or by simply mixing particulate stabilizers into the polymer particulate. This however results in unacceptable deposits of the UV-stabilizer on the surface of the mould-used in rotational moulding.

BRIEF SUMMARY OF THE INVENTION

It has now been found that the moulding powder for rotational moulding may be sufficiently stabilized by simple mixing of a polyolefin polymer powder with a small quantity of a masterbatch of UV-stabilized-loaded polymer particles. In this way polyolefin powder particles as produced in a polymerization reactor may be used directly to produce the moulding powder without requiring energy-intensive extruder mixing and granulation and grinding of the entire material used to produce the moulding powder. Furthermore the problem of deposits of UV-stabilizer on the mould is reduced or avoided.

Thus viewed from one aspect the invention provides a process for the preparation of a moulded polymer item, said process comprising obtaining a polymer moulding powder having a mean particle size of 1 to 2000 $\mu$m comprising an admixture of UV-stabilizer-loaded polymer particles and non-UV-stabilizer-loaded polyolefin polymer particles, loading said powder into a mould, heating and rotating said mould to melt said powder, cooling said mould, and releasing said moulded polymer item from said mould.

DETAILED DESCRIPTION OF THE INVENTION

The moulded items produced by the process of the invention may for example be products which will experience extended exposure to light, e.g. tanks (in particular water storage tans), boats, etc.

The process of the invention optionally includes the step of producing the moulding powder by admixing UV-stabilizer-loaded and non-UV-stabilizer-loaded polymer particles and also optionally includes the step of preparing the non-loaded polymer particles by polymerization of an $\alpha$-olefin monomer or of a plurality of monomers comprising at least one $\alpha$-olefin, preferably using a polymerization technique which produces polymer particles of the desired size and morphology, thereby avoided the need for melting and grinding the majority of the polymer.

Viewed from a further aspect the invention provides a polymer moulding powder for rotational moulding having a mean particle size of 1 to 2000 $\mu$m comprising an admixture of UV-stabilizer-loaded polymer particles and non-UV-stabilizer-loaded polyolefin polymer particles.

Viewed from a still further aspect the invention provides moulded polymer items produced by the process of the invention.

Viewed from a yet further aspect the invention provides a method of preparing a polymer moulding powder for rotational moulding, said method comprising: (i) obtaining a plurality of polyolefin polymer particles having a mean particle size of 1 to 2000 $\mu$m, preferably by a polymerization method yielding a particulate product of the desired particle size; (ii) obtaining a second polymer; (iii) intimately mixing said second polymer with a UV-stabilizer to produce a plurality of UV-stabilizer loaded polymer particles, e.g. by admixing stabilizer and particles of said second polymer followed by melting and grinding the resultant admixture; (iv) admixing polymer particles obtained in step (i) with UV-stabilizer-loaded polymer particles obtained in step (iii).

The moulding powder used according to the invention preferably has a mean polymer particle size (e.g. as determined using a particle size analyser such as a Malvern analyzer) of 50 to 1000 $\mu$m, especially 100 to 500 $\mu$m. The particle size distribution is preferably such that:

D(v, 0.5) is between 100 and 500 $\mu$m
D(v, 0.1) is between 50 and 300 $\mu$m
D(v, 0.9) is between 300 and 1000 $\mu$m
most preferably D(v, 0.5) being between 200 and 400 $\mu$m, D(v, 0.1) being between 100 and 200 $\mu$m, and D(v, 0.9) being between 400 and 600 $\mu$m.

(D(v, 0.5) means the particle diameter below which 50% by volume of the particles fall; similarly D(v, 0.1) is the particle diameter below which 10% by volume of the particles fall). This choice of particle size and uniformity ensures uniformity in the resulting rotationally moulded product.

For different polyolefin polymers, the optimum particle sizes will differ slightly. However, by way of example for polyethylenes with $MFR_2$ 1 to 40 and densities 920 to 950 $kg/m^3{}_1$ the optimum particle size will generally be 100 to 600 $\mu$m. Where the particle size is too large, the melting characteristics in rotational moulding will be poor leading to mechanically sub-standard moulded products. On the other hand, where the particle size is too small the powder will have poor flow characteristics and will not distribute evenly in the mould.

The particle sizes and particle size distributions for the UV-stabilizer-loaded and unloaded particulates which make up the moulding powder are preferably closely similar although a difference in mean particle size of up to 20% or more preferably up to 10% for the two sets of particles is tolerable. Such similarity in size ensures that unwanted separation of loaded and unloaded particles in the moulding powder does not occur during storage or transportation.

The UV-stabilizer-loaded particulates are preferably formed of the same or a similar polymer to the unloaded polyolefin particles. Some variation in polymer type is tolerable but generally the predominant monomer should be the same for both particulates. This ensures that the moulding powder melts substantially uniformly during the moulding process.

The polymers used will preferably have a narrow molecular weight distribution Mw/Mn to ensure a relatively sharp melting point and hence even distribution in the mould. Mw/Mn values preferably lie in the range 2 to 10, more especially 2 to 5. Preferably the polymers should have a melting point of 100 to 180° C., more preferably 120 to 130° C., with a melting range of less than 20° C.

The non-UV-stabilizer-loaded polyolefin polymer particulate preferably has a very homogeneous molecular structure, seen as a narrow melting range in the curve obtained by differential scanning calorimetry and as a very even crystal structure in micrographic studies. This ensures that the powder melts evenly and that the homogeneity of the moulded product is high.

To ensure that the moulds used in rotational moulding may be loaded with sufficient polymer to produce moulded items with adequate wail thicknesses, it is also desirable that the moulding powder should have a bulk density of at least 300 kg/m$^3$ more preferably at least 330 kg/m$^3$, e.g. 330 to 500 kg/m$^3$, more particularly 450 to 490 kg/m$^3$.

The polymer density is conveniently in the range 800 to 1000 kg/m$^3$ particularly 850 to 950 kg/m$^3$. For polyethylene, the density is preferably 920 to 950 kg/m$^3$, more preferably 930 to 940 kg/m$^3$. For polypropylenes, the density is preferably 880 to 950 kg/m$^3$ more preferably 890 to 910 kg/m$^3$.

The polymer preferably has a melt flow rate MFR$_2$ of 1 to 30 g/10 min., more preferably 2 to 20 g/10 min. For polyethylenes, the MFR$_2$; is preferably 2 to 10 g/10 min., more preferably 5 to 7.5 g/10 min. For polypropylenes, the MFR$_2$ is preferably 10 to 20 g/10 min., more preferably 12 to 18 g/10 min.

The polymer moulding powder preferably has a dry flow of 10 to 40 s/100 g, more preferably 15 to 30 s/100 g.

The polymers used according to the invention are preferably homopolymers or copolymers of α-olefins, in particular polymers deriving from a C$_{2-4}$ α-olefin, particularly propylene and more particular ethylene, optionally together with one or more comonomers, e.g. selected from mono or, dienes such as C$_{2-14}$ mono or dienes, particularly C$_{2-8}$ α-olefins. Preferably at least 50% by weight of the polymer structure derives from a C$_{2-4}$ α-olefin.

Such polymers may be prepared by conventional olefin polymerization techniques, e.g. using Ziegler Natta or metallocene catalysts or chromium catalysts and polymerization processes such as gas phase, slurry, and solution process, especially slurry processes. Typically gas phase, loop and tank reactors may be used. However it has been found that polyolefin polymer particles of appropriate size for preparation of the moulding powder may readily be prepared using supported catalysts, in particular catalysts comprising porous particulates loaded with the catalyst, e.g. the reaction product of a metallocene and an aluminoxane. Such supported catalysts may be prepared for example by forming a slurry of particulate support, metallocene, aluminoxane and solvent, draining off excess solvent, rinsing of excess metallocene/aluminoxane and drying. Such catalyst support preparation techniques are known in the art.

The catalyst support material used to carry an olefin polymerization catalyst is conveniently an inorganic or organic material, e.g. an inorganic oxide such as silica, alumina or zirconia or an inorganic halide such as magnesium chloride, or a polymer such as an acrylate or methacrylate. Preferably the support material, if inorganic, is, subjected to a heat treatment (calcination) before catalyst impregnation, e.g. by a period of heat treatment in a dry, non-reducing (e.g. oxygen containing) atmosphere such as air at a temperature of at least 200° C., preferably at least 400° C. and especially preferably at least 600° C., for a period of 0.5 to 50 hours, e.g. 2 to 30 hours, preferably 10 to 20 hours. The support material before calcination conveniently has a surface area of 20 to 500 mL/g (BET method), a porosity of 0.2 to 3.5 mL/g and a mean particle size of 10 to 200 μm.

The catalyst with which the support material is impregnated may be any polymerization catalyst although preferably it will be a Ziegler Natta catalyst (i.e. the combination of a transition metal (e.g. Ti, V or Cr) compound and an aluminium compound), a pyrazolyl catalyst (e.g. as described in WO97/17379, U.S. Pat. No. 4,808,680, EP-A-482934, U.S. Pat. No. 5,312,394 or EP-A-617052) or a metallocene catalyst.

Examples of suitable catalysts are known from: EP-A-206794, EP-A-22595, EP-A-420436, EP-A-347128, EP-A-551277, EP-A-648230, WO 94/03506, WO 96/28479, U.S. Pat. No. 5,057,475, EP-A-672688, EP-A-368644, EP-A-491842, EP-A-614468, EP-A-705281, WO 93/19103, WO 95/07939, WO 97/29134, WO 98/02470, WO 95/12622, U.S. Pat. No. 5,086,135, U.S. Pat. No. 5,455,214, WO 97/32707, EP-A-519237, EP-A-518092, EP-A-444474, EP-A-416815, EP-A-62.979, EP-A-284708, EP-A-354893, EP-A-567952 and EP-A-661300.

For metallocene-based catalysts, the catalytically effective metal is preferably a transition metal or a lanthanide, especially a group 4, 5 or 6 metal, e.g. Ti, Zr or Hf. Such metallocenes include a η-bonding ligand, e.g. an optionally substituted optionally fused homo or heterocyclic cyclopentadienyl ligand, preferably with 1, 2 or 3 η-bonding groups coordinating the metal (the term metallocene is often used to denote complexes in which a metal is coordinated by η-bonding groups—here, however, it is used in its broader sense to cover complexes in which the metal is coordinated by one or more η-bonding groups, i.e. groups which use their η-oribtals to complex the metal). Examples of such η-bonding ligands include cyclopentadienyl, indenyl, tetrahydroindenyl, fluorenyl and octahydrofluorenyl ligands and bridged dimers where such η-ligands are attached, e.g. via a 1, 2, 3 or 4atom chain (e.g. containing C, N, O, S, Si or P chain atoms—for example an ethylene or Si(CH$_3$)$_2$ group), to a further such η-ligand.

Thus by way of example the metallocene catalyst may be of formula I $$(CpR'_k)_m MR_n X_q \tag{I}$$

where Cp is a fused or non fused homo or heterocyclic cyclopentadienyl η-ligand;

R' is a hydrocarbyl, hydrocarbyloxy, hydrocarbylsilyloxy or hydrocarbylgermyloxy group containing 1 to 20 carbon atoms or one R' is a bridging group to a further fused or non fused homo or heterocyclic cyclopentadienyl η-ligand, the bridging group preferably providing a 1, 2, 3 or 4 atom chain between the cyclic groups, for example with C, N, O, S, P or Si chain atoms, especially C and/or Si, e.g. an ethylene group;

k is zero or an integer having a value of 1, 2, 3, 4 or 5;

M is a group 4, 5 or 6 metal;

X is a halogen atom;

R is hydrogen or a hydrocarbyl or hydrocarbyloxy group containing 1 to 20 carbon atoms;

m is the integer 1, 2 or 3;

n and q are zero or integers 1, 2 or 3; and the sum of m, n and q corresponds to the degree of coordination possible for M in the oxidation state in which it exists.

Preferably the metallocene contains at least one Cp group other than unsubstituted cyclopentadienyl, i.e. preferably the metallocene is a "substituted metallocene".

Particularly preferably the metallocene is a bridged bis-indenyl metallocene.

Many metallocene catalysts are known, e.g. as described in the patent publications mentioned above and the patent publications of Exxon, Mobil, BASF, DOW, Fina, Hoechst and Borealis, e.g. EP-A-206749, etc.

Typical examples of suitable metallocenes include the following:

cyclopentadienyl, indenyl, fluorenyl, pentamethylcyclobutadienyl, methyl-cyclopentadienyl, 1,3-di-methyl-cyclopentadienyl, i-propyl-cyclopentadienyl, 1,3-di-i-propyl-cyclopentadienyl, n-butyl-cyclopentadienyl, 1,3-di-n-butyl-cyclopentadienyl, t-butyl-cyclopentadienyl, 1,3-di-t-butyl-cyclopentadienyl, trimethylsilyl-cyclopentadienyl, 1,3-di-trimethylsilyl-cyclopentadienyl, benzyl-cyclopentadienyl, 1,3-di-benzyl-cyclopentadienyl, phenyl-cyclopentadienyl, 1,3-di-phenyl-cyclopentadienyl, naphthyl-cyclopentadienyl, 1,3-di-naphthyl-cyclopentadienyl, 1-methyl-indenyl, 1,3,4-tri-methyl-cyclopentadienyl, 1-i-propyl-indenyl, 1,3,4-tri-i-propyl-cyclopentadienyl, 1-n-butyl-indenyl, 1,3,4-tri-n-butyl-cyclopentadienyl, 1-t-butyl-indenyl, 1,3,4-tri-t-butyl-cyclopentadienyl, 1-trimethylsilyl-indenyl, 1,3,4-tri-trimethylsilyl-cyclopentadienyl, 1-benzyl-indenyl, 1,3,4-tri-benzyl-cyclopentadienyl, 1-phenyl-indenyl, 1,3,4-tri-phenyl-cyclopentadienyl, 1-naphthyl-indenyl, 1,3,4-tri-naphthyl-cyclopentadienyl, 1,4-di-methyl-indenyl, 1,4-di-i-propyl-indenyl, 1,4-di-n-butyl-indenyl, 1,4-di-t-butyl-indenyl, 1,4-di-trimethylsilyl-indenyl, 1,4-di-benzyl-indenyl, 1,4-di-phenyl-indenyl, 1,4-di-naphthyl-indenyl, methyl-fluorenyl, i-propyl-fluorenyl, n-butyl-fluorenyl, t-butyl-fluorenyl, trimethylsilyl-fluorenyl, benzyl-fluorenyl, phenyl-fluorenyl, naphthyl-fluorenyl, 5,8-di-methyl-fluorenyl, 5,8-di-i-propyl-fluorenyl, 5,8-di-n-butyl-fluorenyl, 5,8-di-t-butyl-fluorenyl, 5,8-di-trimethylsilyl-fluorenyl, 5,8-di-benzyl-fluorenyl, 5,8-di-phenyl-fluorenyl and 5,8-di-naphthyl-fluorenyl.

The catalysts may require the use of a co-catalyst or catalyst activator. Preferred as co-catalysts are boron compounds and more preferably aluminoxanes, in particular the $C_{1-10}$ alkyl aluminoxanes and most particularly methyl aluminoxane (MAO).

Such aluminoxanes may be used as the sole co-catalyst or alternatively may be used together with other co-catalysts. Thus besides or in addition to aluminoxanes, other cation complex forming catalyst activators may be used. In this regard mention may be made of the silver and boron compounds known in the art. What is required of such activators is that they should react with the metallocene or pyrazolyl complex to yield an organometallic cation and a non-coordinating anion (see for example the discussion on non-coordinating anions J⁻ in EP-A-617052 (Asahi)).

Aluminoxane co-catalysts are described by Hoechst in WO94/28034. These are linear or cyclic oligomers having up to 40, preferably 3 to 20, —[Al(R")O]— repeat units (where R" is hydrogen, $C_{1-10}$ (preferably methyl) or $C_{6-18}$ aryl or mixtures thereof).

Where co-catalyst is used, it may be used separately but more preferably it is also loaded onto the porous support material. In this event it is preferred to allow the catalyst and the co-catalyst to react in a liquid phase and to load the reaction product onto the support.

The polymer which is loaded with the UV-stabilizer may be produced by similar techniques or by other conventional polymerization techniques.

The UV-stabilizer used in the present invention may be any organic molecule UV-stabilizer, e.g. a UV absorber, e.g. a benzophenone, benzotriazole, a hindered amine light stabilizer (a HALS) for example a hindered cyclic amine, or a polymeric amine, in particular hindered polymeric amines, e.g. compounds containing one or more azacyclohexyl groups and more particularly 2,2,6,6-tetramethyl-1-azacyclohexyl or 1,2,2,6,6-pentamethyl-1-azacyclohezyl residues, for example in the polymer repeat units. Examples of suitable UV-stabilizers include Tinuvin 622, Tinuvin 326, Tinuvin 327, Tinuvin 770, Chimasorb 81, Chimasorb 944, Chimasorb 2020, Cyasorb UV-3529, Cyasorb UV-3346, Hostavin N30, Hostavin N20, Dastib 845, ADK STAB LA63, ADK STAB LA68LD, ADK STAB,LA57, ADK STAB LA67, Uvinyl 4050H, CGL 2020, CGL 116, UV Check AM806, Uvasorb HA88, N,N'-bis(2,2,6,6-tetramethyl-4-piperidyl)-N,N'-hexamethylenebis (formamide), N-(2,2,6,6-tetramethyl-4-piperidyl)-maleinimide, CAS No. 1843-05-06, CAS No. 3864-99-1, CAS No. 3896-11-5, CAS No. 52829-07-9, CAS No. 41556-26-7, CAS No. 82919-37-7, CAS No. 86403-32-9, CAS No. 604022-61-3, CAS No. 91788-83-9, CAS No. 102089-33-8, CAS No. 73704-27-5, CAS No. 136504-96-6, CAS No. 193098-40-7, CAS No. 82451-48-7, CAS No. 101544-98-3, CAS No. 84696-70-0, CAS No. 81406-61-3, CAS No. 94274-03-0, CAS No. 65447-77-0, CAS No. 71878-19-8 and CAS No. 106990-43-6.

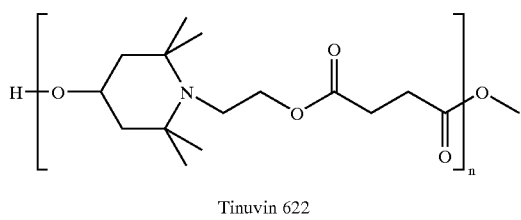
Tinuvin 622
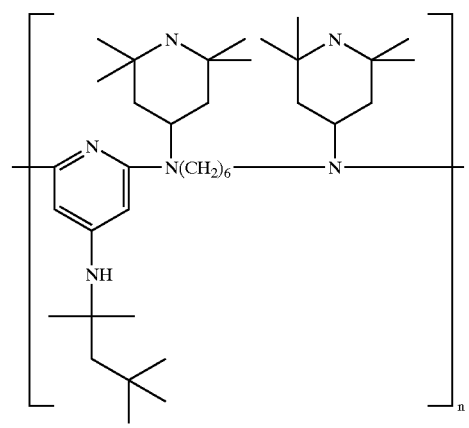
Chimasorb 944
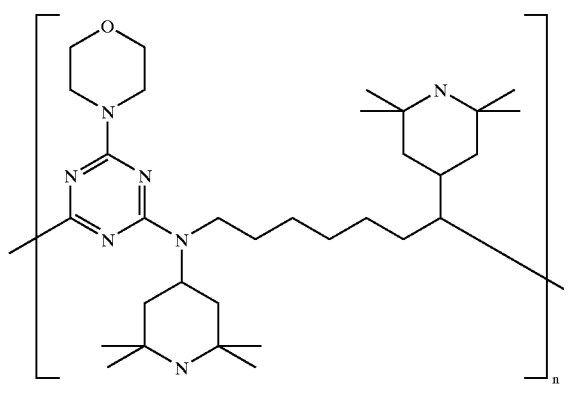
Cyasorb UV-3346
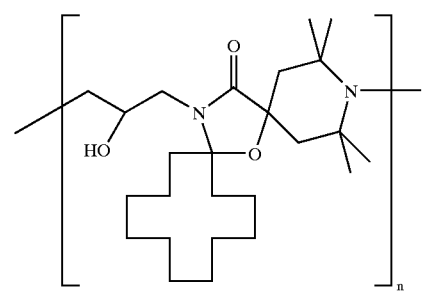
Hostavin N30
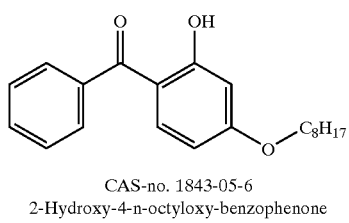
CAS-no. 1843-05-6
2-Hydroxy-4-n-octyloxy-benzophenone
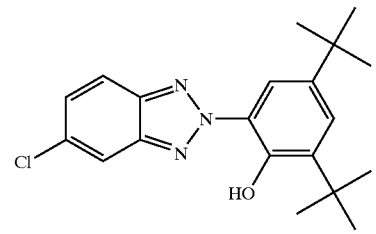
CAS-no. 3864-99-1
2-(3′,5′-di-t-butyl-2′-hydroxyphenyl)-5-chlorobenzotriazol
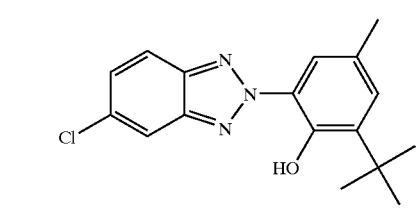
CAS-no. 3896-11-5
2-(3′-t-butyl-5′-methyl-2′-hydroxyphenyl)-5-chlorobenotriaz
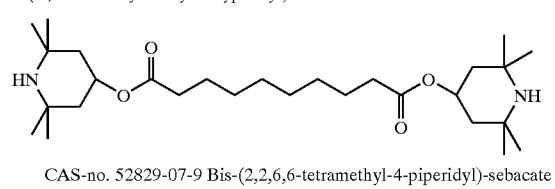
CAS-no. 52829-07-9 Bis-(2,2,6,6-tetramethyl-4-piperidyl)-sebacate
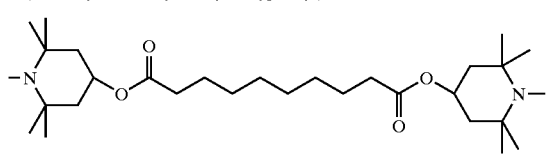
CAS-no. 41556-26-7, 82919-37-7 Bis-(1,2,2,6,6-pentamethyl-4-piperidyl)-sebacate
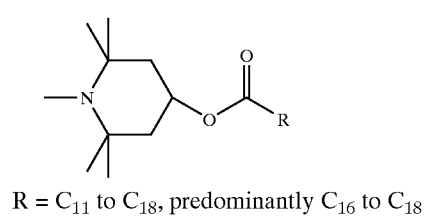
$R = C_{11}$ to $C_{18}$, predominantly $C_{16}$ to $C_{18}$
CAS-no. 86043-32-9

-continued

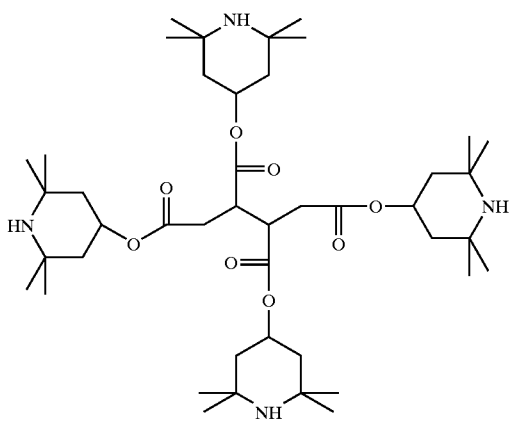

CAS-no. 64022-61-3
Tetrakis(2,2,6,6-tetramethyl-4-piperidyl)
1,2,3,4-butane tetracarboxylate

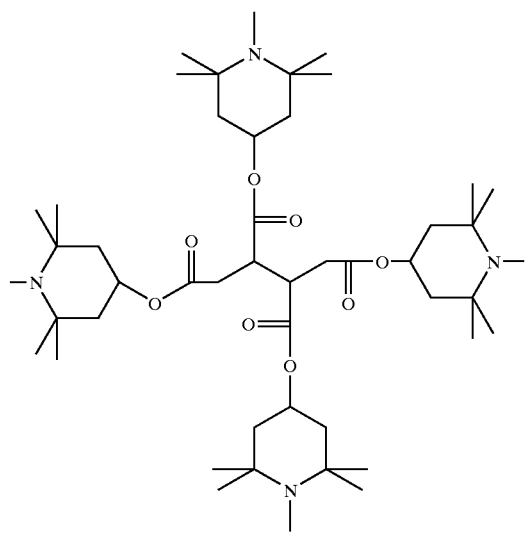

CAS-no. 91788-83-9
Tetrakis(1,2,2,6,6-pentamethyl-4-piperidyl)-1,2,3,4-
butane tetracarboxylate

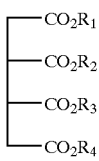

$R_1, R_2, R_3$ and $R_4 = C_{13}H_{27}$ or 1,2,2,6,6-pentamethyl-4-piperidyl
CAS-no. 101544-98-3

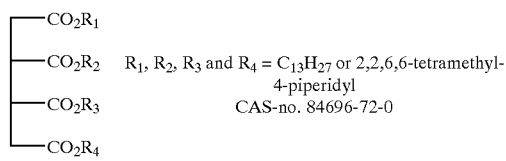

$R_1, R_2, R_3$ and $R_4 = C_{13}H_{27}$ or 2,2,6,6-tetramethyl-4-piperidyl
CAS-no. 84696-72-0

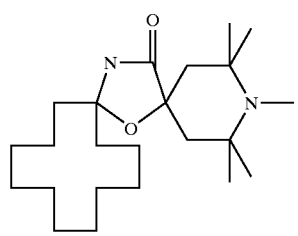

CAS-no. 81406-61-3
2,2,4,4-Tetramethyl-7-oxa-3,20-diaza-dispiro-
(5.1.11.2)-heneicosane-21-one

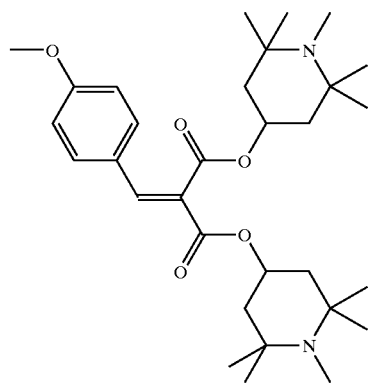

CAS-no. 94274-03-0
Propanedioic, ((4-methoxyphenyl)-methylene),
bis(1,2,2,6,6-pentamethyl-4-piperidyl)ester

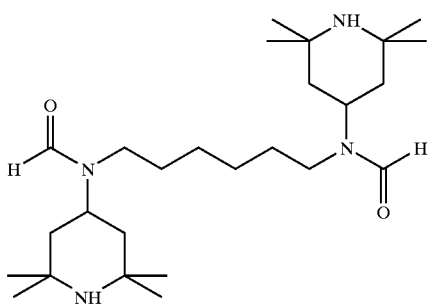

N,N'-bis(2,2,6,6-tetramethyl-4-piperidyl)-
N,N'-hexamethylenebis(formamide)

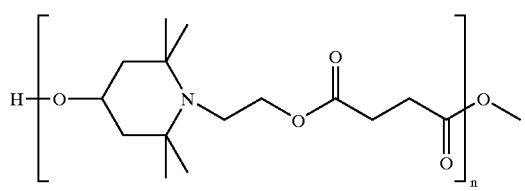

CAS-no. 65447-77-0
Dimethyl succinate polymer with 4-hydroxy-
2,2,6,6-tetramethyl-1-piperidine ethanol

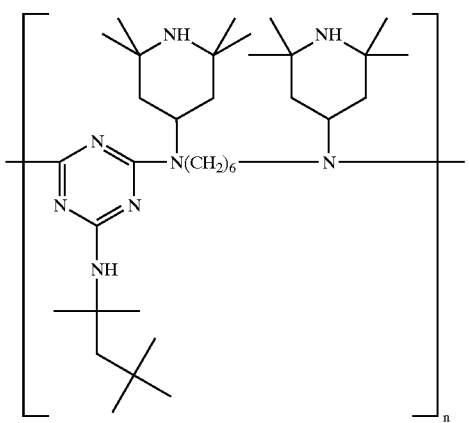
CAS-no. 71878-19-8
Poly((6-((1,1,3,3-tetramethylbutyl)amino)-
1,3,5-triazine-2,4-diyl)(2,2,6,6-tetramethyl
-4-piperidyl)imino)-1,6-hexanediyl-
((2,2,6,6-tetramethyl-4-piperidyl)imino))-
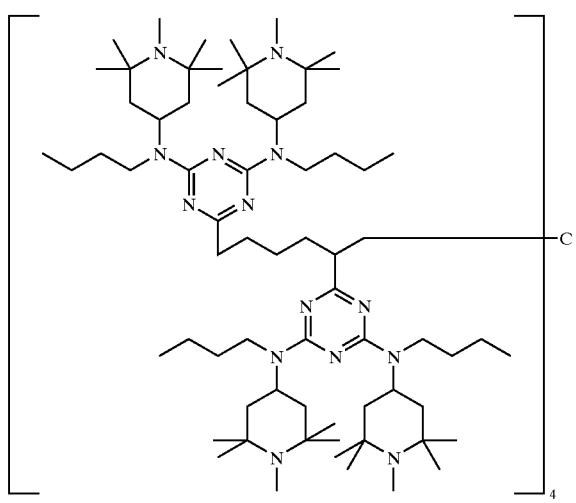
CAS-no. 106990-43-6
1,3,5-Triazine-2,4,6-triamine,N,N'''-(1,2-ethane-diyl-bis(((4,6-
bis(butyl(1,2,2,6,6-pentamethyl-4-piperidyl)amino-1,3,5-triazine-2-yl)
imin 3,1-propane-diyl))-bis-(N',N''-dibutyl-N',N''-bis-
(1,2,2,6,6-pentamethyl-4-piperidyl)-
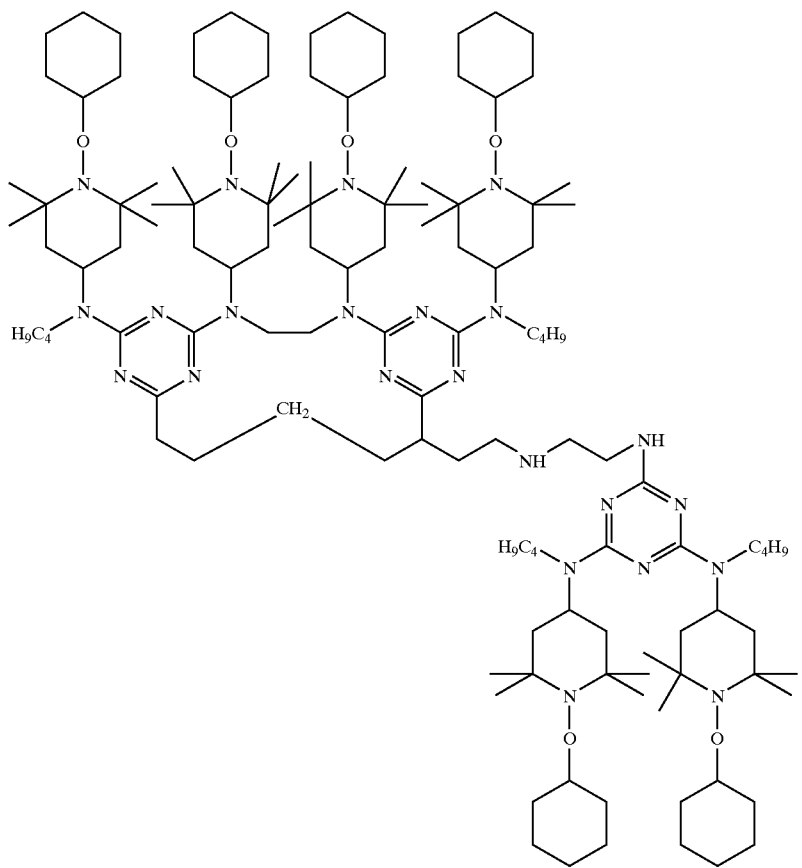
CAS-no. 191680-81-6
CGL-116

-continued
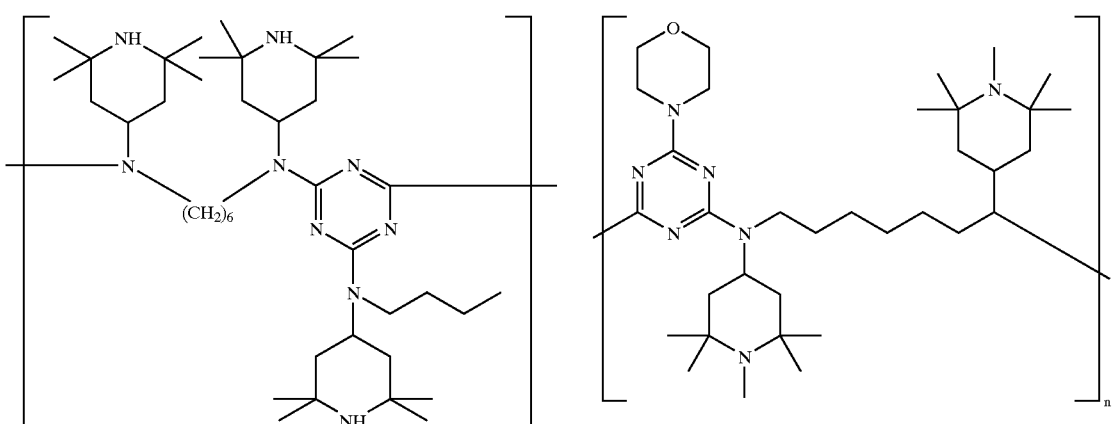
CAS-no. 192268-64-7
CGL-2020
CAS-no. 193098-40-7
Poly((6-morpholino-s-triazine-2,4-diyl)
(1,2,2,6,6-pentamethyl-4-piperidyl)imino)
hexamethylene(1,2,2,6,6-pentamethyl-
4-piperidyl)imino))
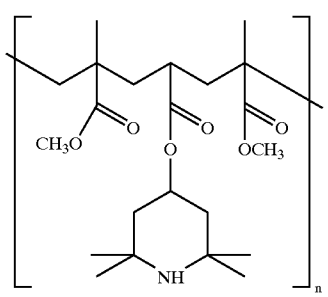
CAS-no. 115340-81-3
UV-Check-AM-806
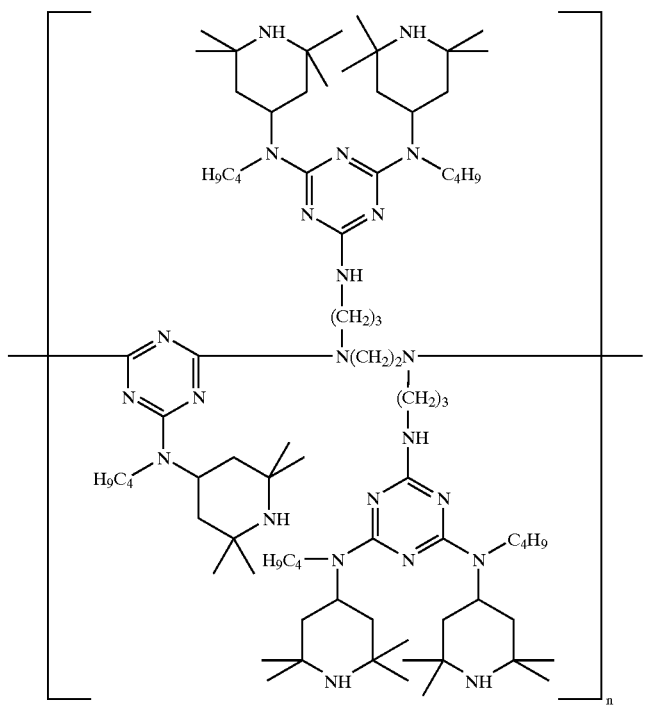
CAS-no. 136504-96-6
1,3-Propanediamine,N,N²-1,2-
ethanediylbis-,polymer with 2,4,6-
trichloro-1,3,5-triazine, reaction product
with N-butyl-2,2,6,6-tetramethyl-4-
piperidinamine -continued
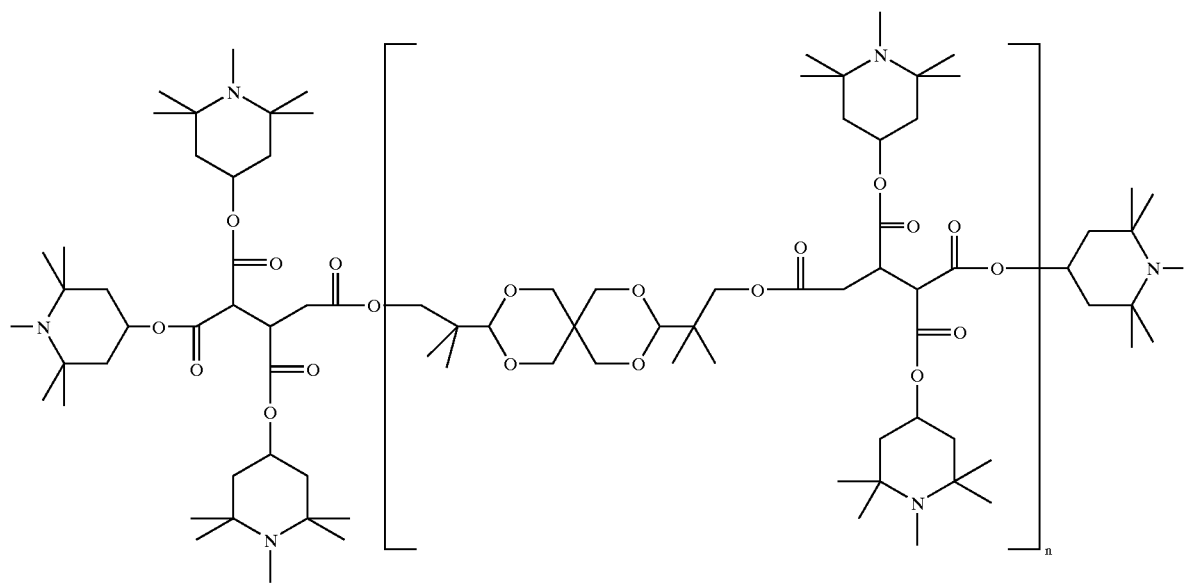
CAS-no. 101357-36-2
ADK STAB LA-63
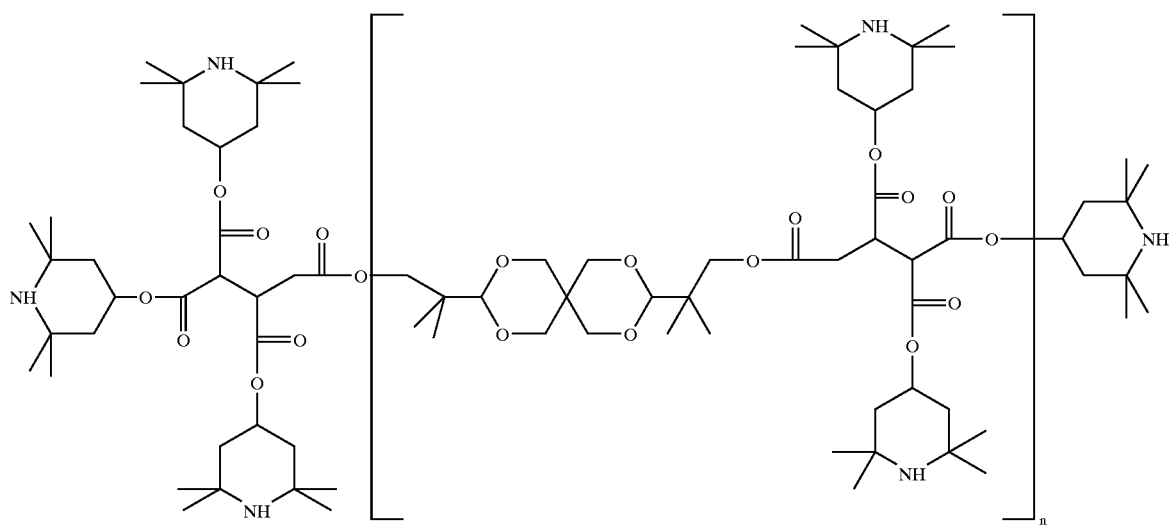
CAS-no. 101357-37-3
ADK STAB LA-68LD
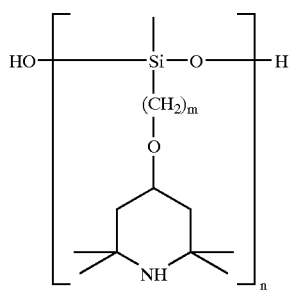
CAS-no. 102089-33-8
Polymethylpropyl-3-oxy-(2,2,6,6-tetramethyl
-4-piperidyl)-siloxane
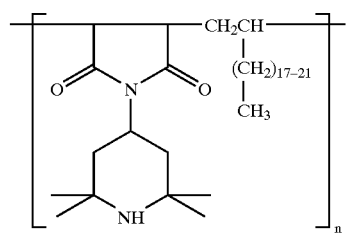
N-(2,2,6,6-tetramethyl-40piperidyl)-
maleinimide, $C_{20}$:$C_{40}$ olefin copolymer

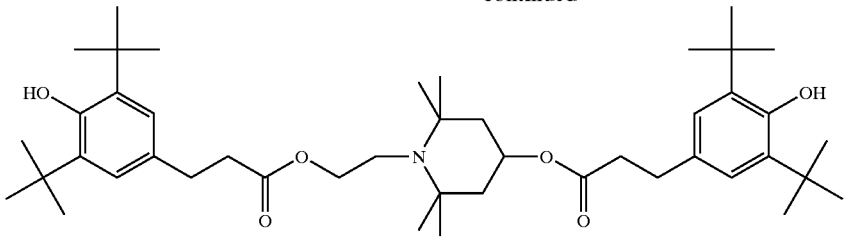

CAS-no. 73754-27-5
4-(3-(3,5-di-t-butyl-4-hydroxphenyl)propionyloxy-1-(2-(3-(3,5-di-t-butyl-4-hydroxyphenyl)-propionyloxy)ethyl))-2,2,6,6-tetramethyl-piperidine

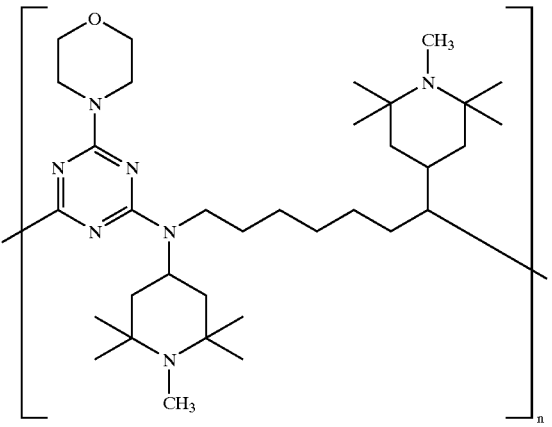

Cyasorb UV-3529 from Oytec CAS. No 193098-40-7 Poly((6-morpholino-s-triazine-2,4-diyl)(1,2,2,6,6-pentamethyl-4-piperidyl)imino)hexamethylene(1,2,2,6,6-pentamethyl-4-piperidyl)imino)).

CAS-no; 192268-64-7 is known as Chimasorb 2020, and is 1,6-hexanediamine, N,N'-bis(2,2,6,6-tetramethyl-4-piperidyl)polymer with 2,4,6-trichloro-1,3,5-triazine, reaction product with N-butyl-1-butanamine and N-butyl-2,2,6,6-tetramethyl-4-piperidinamine.

Viewed from a further aspect the invention provides a polyethylene rotomoulding powder containing one of the aforementioned TV-stabilizers, eg Chimasorb 2020 or Cyasorb UV-3529.

The UV-stabilizer conveniently has a melting point/softening point in the range 20 to 200° C., more particularly 55 to 150° C., or is in a liquid form at ambient temperature. Typically, the stabilizer may have a (weight average) molecular wieght in the range 300 to 5000, more generally 500 to 3000.

Besides the UV-stabilizer, the moulding powder may, and indeed generally will; contain other stabilizers and additives.

The other stabilizers used according to the invention may be any materials capable of inhibiting degradation of the polyolefin polymer. Appropriate such stabilizer materials include antioxidants, antiacids and thermal stabilizers.

Examples of antioxidants include phenols, phosphites, phosphonites, thioesters and thioethers, e.g. trinonylphenylphosphite. Examples of antiacids include stearates (e.g. Zn-stearate), carbonates, and hydrotalcite.

Particularly preferably, the UV-stabilizer-loaded polymer particles will be loaded with more than one stabilizer material, preferably at least one antioxidant and at least one UV-stabilizer.

Besides the stabilizer(s), the moulding powder may contain with other additives, e.g. lubricants, anti-fogging agents, plasticizers, flame retardants, etc.

Preferably, all ingredients in the rotomoulding powder will be of a grade approved for food contact purposes.

The loading of the polymer particles with UV-stabilizers (and optionally other additives) is conveniently effected by extrusion (e.g. from a high shear mixer) and granulation and subsequent grinding of the solidified product. It is desirable that the UV-stabilizer be distributed throughout the stabilizer loaded particles.

Desirably the UV-stabilizer, a particulate polymer and any further additives (e.g. antioxidants) to be included in the masterbatch particulate are blended in a mechanical mixer (e.g. a Forberg blender) before being introduced into an extruder (e.g. a Brabander extruder 19/25). The extrudate is then ground and sieved to select a particulate of the desired particle size range.

The remaining components of the moulding powder, if any, can be added when the masterbatch and the non-loaded polyolefin particles are mixed together. Liquid or low melting components may be sprayed onto the particulate mixture and solid components may be mixed in in particulate form, preferably powder form.

Thus in a preferred embodiment a stabilizer (or stabilizer plus additives mixture) is sprayed onto a mixture of UV-stabilizer-loaded and non-loaded polymer particles in a mixer chamber, e.g. the mixing chamber of a mechanically fluidized bed mixer (for example a Forberg mixer). It is preferred that both the liquid: being sprayed and the polymer particles are heated, e.g. to 40 to 150° C., preferably 60 to 110° C. Stabilizers and additives may be added to the polymer together or sequentially. If powdered additives or stabilizers are added however it is preferred that their particle sizes be comparable to or smaller than that of the polymer.

Thus viewed from a further aspect the invention provides a process for the preparation of a moulding powder for rotational moulding, said process comprising spraying a heated liquid stabilizer composition onto an agitated heated polymer particulate having a mean particle size in the range 1 to 2000 μm in a mechanically fluidized bed mixer, said polymer particulate comprising an admixture of polymer particles loaded with a UV-stabilizer and polyolefin polymer particles not loaded with a UV-stabilizer.

In this process it is preferred that the liquid stabilizer composition be heated to a temperature in the range 90 to 140° C., more preferably 100 to 130° C., and that the polymer, before spraying commences, be heated to a temperature in the range 60 to 80° C. The spraying may be direct, e.g. through a preheated spray die, or indirect, e.g. by directing a flow of liquid onto a diffuser.

In the moulding powder, the polymer particles will desirably contain UV-stabilizer loaded polymer particles and non-loaded polyolefin polymer particles in a weight ratio of from 0.5:99.5 to 1:10, more preferably 1:99 to 5:95, still more preferably 2:98 to 4:96.

The UV-stabilizer loaded particles (the masterbatch) will preferably contain 3 to 20%, more preferably 5 to 15%, still more preferably 8 to 12% by weight of the UV-stabilizer. The precise level of UV-stabilizer loading clearly affects the amount of masterbatch added in the moulding powder. For a 10% UV-stabilizer masterbatch it will generally be possible to use a 25:975 (w/w) masterbatch to non-loaded polymer ratio, meaning that only 25 g of each kg of polymer needs to be extruded and ground.

The moulding powder will preferably contain other stabilizers and additives at conventional concentrations, e.g. at individual concentrations in the 100 to 5000 ppm range.

Rotational moulding using the moulding powder of the invention may be effected conventionally, e.g. using commercially available rotomoulding apparatus. The oven temperature and oven curing time may be selected according to the melting characteristics of the polymer and the thickness of the item being produced.

The invention is illustrated further by the following non-limiting Examples.

EXAMPLE 1

| Masterbatch preparation | |
|---|---|
| Chimasorb 944* (UV stabilizer) | 10 parts by weight |
| Irgafos 168* (antioxidant) | 1200 ppm |
| Polyethylene powder | to 100 parts by weight |

*Available from Ciba Specialty Chemicals

Polyethylene powder (bulk density 460 to 480 kg/m³, MFR$_2$ 5.9 to 6.8 g/10 min., and particle size distribution: 600 μm max. 0%, 500 μm max 5%, 425 μm max 5–30%, 300 μm max 2.0–40%, 212 μm max 15–35%, 150 μm max 8–20%, <150 μm max 10%) obtained by metallocene catalysed polymerization of ethylene (and hex-1-ene as a comonomer) was blended in a Forberg mixer for six minutes with the Chimasorb and Irgafos stabilizers. The blend was pelletized on a Brabander extruder 19/25 (temperature profile 180° C.–200° C.-200° C.-200° C., screw rate 120 rpm). The pellets were ground in a mill and sieved on a 400 μm sieve to produce the masterbatch.

EXAMPLE 2

| Masterbatch preparation | |
|---|---|
| Tinuvin 783* | 10 parts by weight |
| Polyethylene powder⁺ | 90 parts by weight |

*Available from Ciba Specialty Chemicals
⁺As in Example 1

Polyethylene powder (bulk density 460 to 480 kg/m³, MFR$_2$ 5.9 to 6.8 g/10 min., and particle size distribution: 600 μm max. 0%, 500 μm max 5%, 425 μm max 5–30%, 300 μm max 20–40%, 212 μm max 15–35%, 150 μm max 8–20%, <150 μm max 10%) obtained by metallocene catalysed polymerization of ethylene (and hex-1-ene as a comonomer) was blended in a Forberg mixer for six minutes with the Tinuvin stabilizer. The blend was pelletized on a Brabander extruder 19/25 (temperature profile 180° C.–200° C.-200° C.-200° C., screw rate 120 rpm) The pellets were ground in a mill and sieved on a 400 μm sieve to produce the masterbatch.

EXAMPLE 3

| Masterbatch preparation | |
|---|---|
| Tinuvin 622* | 5 parts by weight |
| Polyethylene powder⁺ | 95 parts by weight |

*Available from Ciba Specialty Chemicals
⁺As in Example 1

Polyethylene powder (bulk density 460 to 480 kg/m³, MFR$_2$ 5.9 to 6.8 g/10 min., and particle size distribution: 600 μm max. 0%, 500 μm max 5%, 425 μm max 5–30%, 300 μm max 20–40%, 212 μm max 15–35%, 150 μm max 8–20%, <15.0 μm max 10%) obtained by metallocene catalysed polymerization of ethylene (and hex-1-ene as a comonomer) was blended in a Forberg mixer for six minutes with the Tinuvin stabilizer. The blend was pelletized on a Brabander extruder 19/25 (temperature profile 180° C.–200° C.-200° C.-200° C., screw rate 120 rpm) The pellets were ground in a mill and sieved on a 400 μm sieve to produce the masterbatch.

EXAMPLE 4

| Masterbatch preparation | |
|---|---|
| Chimasorb 2020* | 10 parts by weight |
| Polyethylene powder⁺ | 90 parts by weight |

*Available from Ciba Specialty Chemicals
⁺As in Example 1

Polyethylene powder (bulk density 460 to 480 kg/m³, MFR$_2$ 5.9 to 6.8 g/10 min., and particle size distribution: 600 μm max. 0%, 500 μm max 5%, 425 μm max 5–30%, 300 μm max 20–40%, 212 μm max 15–35%, 150 μm max 8–20%, <150 μm max 10%) obtained by metallocene catalysed polymerization of ethylene (and hex-1-ene as a comonomer) was blended in a Forberg mixer for six minutes with the Chimasorb stabilizer. The blend was pelletized on a Brabander extruder 19/25 (temperature profile 180° C.–200° C.-200° C.-200° C., screw rate 120 rpm) The pellets were ground in a mill and sieved on a 400 μm sieve to produce the masterbatch.

EXAMPLE 5

| Moulding powder | |
|---|---|
| Masterbatch (from Example 1) | 2.5 parts by weight |
| Irganox 1010* (antioxidant) | 600 ppm |
| Irgafos 38* (antioxidant) | 1200 ppm |
| Zn-stearate+ | 1800 ppm |
| Keydol mineral oil (diluent) | 500 ppm |
| Polyethylene powder (as in Example 1) | to 100 parts by weight |

*Available from Ciba Specialty Chemicals
+Available as Zincum AV from Bärlocher

The antioxidants were heated to 100–130° C. together with the mineral oil. The polyethylene powder was heated to 70° C. in a high speed mixer and then transferred to a mechanically fluidised fluid bed mixer, e.g. a Forberg mixer. Zn-stearate powder and masterbatch were added and the mixture was blended for 2 to 3 minutes. The hot antioxidants were sprayed onto the mixture through a pre-heated die while mixing continued. Blending was stopped 6 minutes after spraying was completed.

EXAMPLE 6

| Moulding powder | |
|---|---|
| Masterbatch (from Example 2) | 2.5 parts by weight |
| Irganox 1076* | 600 ppm |
| Irgafos 38* | 1000 ppm |
| Zn-stearate+ | 1800 ppm |
| Ondina 933 mineral oil++ | 500 ppm |
| Polyethylene powder (as Example 1) | to 100 parts by weight |

++Available from Shell
*Available from Ciba Specialty Chemicals
+Available as Zincum AV from Barlocher The antioxidants were heated to 100–130° C. together with the mineral oil. The polyethylene powder was heated to 70° C. in a high speed mixer and then transferred to a mechanically fluidised fluid bed mixer, e.g. a Forberg mixer. Zn-stearate powder and masterbatch were added and the mixture was blended for 2 to 3 minutes. The hot antioxidants were sprayed onto the mixture through a pre-heated die while mixing continued. Blending was stopped 6 minutes after spraying was completed.

EXAMPLE 7

| Moulding powder | |
|---|---|
| Masterbatch (from Example 4) | 2.5 parts by weight |
| Irganox 1076* | 600 ppm |
| Irgafos 38* | 1000 ppm |
| Zn-stearate+ | 1800 ppm |
| Ondina 941 mineral oil++ | 500 ppm |
| Polyethylene powder(as Example 1) | to 100 parts by weight |

++Available from Shell
*Available from Ciba Specialty Chemicals
+Available as Zincum AV from Bärlocher The antioxidants were heated to 100–130° C. together with the mineral oil. The polyethylene powder was heated to 70° C. in a high speed mixer and then transferred to a mechanically fluidised fluid bed mixer, e.g. a Forberg mixer. Zn-stearate powder and masterbatch were added and the mixture was blended for 2 to 3 minutes. The hot antioxidants were sprayed onto the mixture through a pre-heated die while mixing continued. Blending was stopped 6 minutes after spraying was completed.

EXAMPLE 8

| Moulding powder | |
|---|---|
| Masterbatch (from Example 4) | 2.5 parts by weight |
| Irganox 1010* | 600 ppm |
| Irgafos 38* | 1000 ppm |
| Zn-stearate+ | 1800 ppm |
| Ondina 941 mineral oil++ | 500 ppm |
| Polyethylene powder(as Example 1) | to 100 parts by weight |

++Available from Shell
*Available from Ciba Specialty Chemicals
+Available as Zincum AV from Bärlocher The antioxidants were heated to 100–130° C. together with the mineral oil. The polyethylene powder was heated to 70° C. in a high speed mixer and then transferred to a mechanically fluidised fluid bed mixer, e.g. a Forberg mixer. Zn-stearate powder and masterbatch were added and the mixture was blended for 2 to 3 minutes. The hot antioxidants were sprayed onto the mixture through a pre-heated die while mixing continued. Blending was stopped 6 minutes after spraying was completed.

In place of Irgafos 38 in Examples 5 to 8 Irgafos P-EPQ (600 ppm) available from Ciba Specialty Chemicals, or Ultranox 641 (600 ppm) available from GE Speciality Chemicals, may be used.

Likewise Ondina 941 (from Shell) or Britol 7NF (from Witco) may be used in Examples 5 to 8 in place of Keydol or Ondina 933.

EXAMPLE 9

Rotational Moulding

The moulding powder of Example 5 was moulded with polyethylene items using a Rotospeed E-60 Express rotomoulding machine. There was no deposit of UV-stabilizer on the mould (FT-IR analysis) and the moulded products had satisfactory impact strength and UV stability.

The rotomoulding machine was a shuttle machine with one cranked arm provided with a 44 kW propane gas burner, a 10000 CFM (283 $m^3$/min) circulating fan, a 750 CFM (21 $m^3$/min) exhaust fan, and two 3350 CFM (95 $m^3$/min) forced air cooling fans. The oven temperature used was 280° C. with an oven time of 10 minutes and a cooling time of 20 minutes.

The moulds used were steel and alumina box moulds of approximately 3000 liter volume and approximately 200 mm×300 mm×450 mm dimensions. The rotation ratio was 9:1.4 and the rotational rates were 9/mm and 1.4/min. The moulding powder load was 2.5 kg giving a wall thickness of approximately 4 mm.

No deposits could be discovered in the mould even after 10 successive mouldings.

Rotomoulded items prepared as in Example 9 were compared with items prepared using a conventional rotomoulding powder (ME8169 from Borealis). Impact strength (using a falling weight at −20° C.) was comparable (1406 N/mm for the product of Example 9 and 1407 N/mm for the comparison product). However the elongation at break following UV exposure (tested according to ISO-4892, weather-o-meter C165) showed a noticeable improvement over time for the product of Example 9 as compared with the comparison product:

| Elongation at break (%) | after 500 hours | after 2000 hours |
|---|---|---|
| Example 9 | 806 | 330 |
| ME8169 | 970 | 300 |

EXAMPLE 10

Comparative Test

A)

Chimasorb 944 (2000 ppm)

Irganox 1010 (600 ppm)

Irgafos 168 (1200 ppm)

Zn-stearate (1800 ppm)

Polyethylene powder (to 100%)

The polyethylene powder was blended with the stabilisers for 6 minutes and then moulded as described in Example 9. Deposits on the mould could be seen visually and FT-IR analysis confirms that the deposits are Chimasorb 944.

B)

| | |
|---|---|
| Eastman Aquastab with 30 wt. % Tinuvin 622 | 8.4 g |
| Eastman Aquastab with 40 wt. % Zinc stearate | 6.8 g |
| Eastman Aquastab with 33.3 wt. % Irgafos 168 and 16.7 wt. % Irganox 1010 | 3.6 g |
| Deionised water | 1 litre |
| Polyethylene powder | 1 kg |

The stabilisers were diluted in deionised water and poured onto the polyethylene powder in a plastic bag and shaken/mixed for 5 minutes to enable the solution to contact all the polyethylene powder. The powder was air dried and then rotational moulded as described in Example 9. Deposits of light stabiliser were observed (visually+FT-IR). The moulded item was very yelow.

C)

Irganos 1076 (660 ppm) (available from Ciba Specialty Chemicals)

Irgafos 38 (1000 ppm)

Zn-sterate (1800 ppm)

Ondina 933 mineral oil (500 ppm) (available from Shell)

Chimasorb 944 (7.5 g) dissolved in acetone (20 g) polyethylene powder up to 100%

The antioxidantes were heated to 100° C. together with the mineral oil. The light stabiliser was dissolved in acetone. The polyethylene powder was heated to 70° C.

The dissolved light stabiliser were sprayed onto the mixer while the powder was circulating for 2 minutes, then the hot antioxidants were spayed onto the mixture in the same way and finally Zn-stearate powder was added. Blending was stopped 6 minutes after spraying was completed.

The stablised polymer powder was air dried in room temperature for 24 hours to let the actone evaporate before it was rotational moulded as described in Example 9. Deposits of Chimasorb 944 were observed (visually and FT-IR analysis).

| | |
|---|---|
| Irganox 1076 | 10 g |
| Irgafos 38 | 20 g |
| Tinuvin 622 | 40 g |
| Mineral oil | 35 g |

The light stabiliser together with the mineral oil were stirred and heated to 100° C. The mixture separated into two layers and it was not possible to spray it onto polymer powder.

What is claimed is:

1. A process for the preparation of a moulded polymer item, said process comprising obtaining a polymer moulding powder having a mean particle size of 1 to 2000 μm comprising an admixture of UV-stabilizer-loaded polymer particles and non-UV-stabilizer-loaded polyolefin polymer particles, loading said powder into a mould, heating and rotating said mould to melt said powder, cooling said mould, and releasing said moulded polymer item from said mould, wherein said UV-stabilizer loaded and UV-stabilizer unloaded particles are present in a weight ratio of from 0.5:99.5 to 1:10, and said UV-stabiliser loaded polymer particles are formed from homopolymers or copolymers of α-olefins.

2. A process as claimed in claim 1 wherein said powder has a mean particle size of 100 to 500 μm.

3. A process as claimed in claim 1 or claim 2 wherein said powder has a bulk density of 300 to 500 kg/m³.

4. A process as claimed in claim 1 wherein said UV-stabilizer is a hindered polymeric amine containing at least one azacyclohexyl group.

5. A process as claimed in claim 1 wherein said UV-stabilizer loaded polymer particles contain 5 to 15% by weight of UV-stabilizer.

6. A polymer moulding powder for rotational moulding having a mean particle size of 1 to 2000 μm comprising an admixture of UV-stabilizer-loaded polymer particles and non-UV-stabilizer-loaded polyolefin polymer particles wherein said UV-stabilizer loaded and UV-stabiliser unloaded particles are present in a weight of from 0.5:99.5 to 1:10, and said UV-stabiliser loaded polymer particles are formed from homopolymers or copolymers of α-olefins.

7. A method of preparing a polymer moulding powder for rotational moulding, said method comprising: (i) obtaining a plurality of polyolefin polymer particles having a mean particle size of 1 to 2000 μm; (ii) obtaining a second polymer formed from a homopolymer or copolymer of α-olefins; (iii) intimately mixing said second polymer with a UV-stabilizer to produce a plurality of UV-stabilizer loaded polymer particles; and (iv) admixing polymer particles obtained in step (i) with UV-stabilizer-loaded polymer particles obtained in step (iii) so as said UV-stabilizer loaded and UV-stabiliser unloaded particles are present in a weight ratio of from 0.5:99.5 to 1:10.

8. A process for the preparation of a moulding powder for rotational moulding, said process comprising spraying a heated liquid stabilizer composition onto an agitated heat polymer particulate having a mean particle size in the range 1 to 2000 μm in a mechanically fluidized bed mixer, said polymer particulate comprising an admixture of α-olefin homo or copolymer polymer particles loaded with a UV-stabiliser and polyolefin polymer particles not loaded with a UV-stabilizer wherein said UV-stabilizer loaded and UV-stabiliser unloaded particles are present in a weight ration of from 0.5:99.5 to 1:10.

9. A polymer moulding powder as claimed in claim 6 wherein said powder has a mean particle size of 100 to 500 μm.

10. A polymer moulding powder as claimed in claim 6 wherein said powder has bulk density of 300 to 500 kg/m$^3$.

11. A polymer moulding powder as claimed in claim 6 wherein said UV-stabilizer is a hindered polymeric amine containing at least one azacyclohexyl group.

12. A polymer moulding powder as claimed in claim 1 wherein said UV-stabilizer loaded polymer particles contain 5 to 15% by weight of UV-stabilizer.

13. A moulded polymer item produced by the process of claim 1.

14. A moulded polymer item produced by the process of claim 2.

15. A moulded polymer item produced by the process of claim 3.

16. A moulded polymer item produced by the process of claim 4.

17. A moulded polymer item produced by the process of claim 5.

* * * * *